United States Patent
Moon (10) Patent No.: US 7,438,436 B2
(45) Date of Patent: Oct. 21, 2008

(54) BACKLIGHT UNIT

(75) Inventor: Jeong Min Moon, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/478,976

(22) Filed: Jun. 29, 2006

(65) Prior Publication Data

US 2007/0030695 A1   Feb. 8, 2007

(30) Foreign Application Priority Data

Aug. 5, 2005   (KR) ...................... 10-2005-0071715

(51) Int. Cl.
*F21V 7/00* (2006.01)
(52) U.S. Cl. ..................... 362/247; 362/97; 362/241
(58) Field of Classification Search ................ 362/225, 362/241, 243–247, 30, 97, 221–223, 29, 362/240, 297, 346; 349/61–70
See application file for complete search history.

(56) References Cited

U.S. PATENT DOCUMENTS

| | | | | |
|---|---|---|---|---|
| 5,283,674 A * | 2/1994 | Hanaoka et al. | ............... | 349/67 |
| 6,407,781 B2 * | 6/2002 | Kitada | .......................... | 349/58 |
| 6,814,456 B1 * | 11/2004 | Huang et al. | .................. | 362/30 |
| 2002/0097354 A1 * | 7/2002 | Greiner | ....................... | 349/61 |
| 2004/0076006 A1 * | 4/2004 | Mai | ........................... | 362/241 |
| 2006/0066773 A1 * | 3/2006 | Huang | ......................... | 349/64 |

FOREIGN PATENT DOCUMENTS

| | | |
|---|---|---|
| CN | 1316668 A | 10/2001 |
| CN | 2630893 Y | 8/2004 |
| CN | 1538216 A | 10/2004 |
| JP | 10-039808 | 2/1998 |

OTHER PUBLICATIONS

First Notification of Office Action for corresponding Chinese Patent Application Serial No. 200610095968.2, dated Oct. 19, 2007.

* cited by examiner

*Primary Examiner*—John A. Ward
*Assistant Examiner*—Robert May
(74) *Attorney, Agent, or Firm*—Brinks Hofer Gilson & Lione (57) ABSTRACT

A backlight unit is provided. The backlight unit comprises a plurality of light emitting lamps arranged in one direction on a bottom surface of a base support. A lower reflection plate is provided on the bottom surface of the base support below the light emitting lamps. A plurality of upper reflection plates are arranged above the light emitting lamps to correspond to the light emitting lamps in a one to one ratio.

19 Claims, 9 Drawing Sheets

BACKLIGHT UNIT

This application claims the benefit of the Korean Patent Application No. P2005-71715, filed on Aug. 5, 2005, which is hereby incorporated by reference as if fully set forth herein.

BACKGROUND

1. Field

A backlight unit is provided.

2. Related Art

Conventionally, cathode ray tubes (CRTs) are mainly used in monitors of TVs, measuring instruments, information terminals, and similar display devices. However, CRTs do not meet the requirements of compact-size and light-weight of electronic products due to their heavy weight and large size.

There is a trend to have smaller and lighter electronic products. CRTs have limitations in reducing their weight and size. Liquid crystal display (LCD) devices utilizing electroluminescent optical effects, plasma display panels (PDPs) using gas discharge, and electroluminescence display (ELD) displays using electroluminescent effects have been used in place of CRTs.

LCD devices have been actively developed as a substitute for CRTs because of the advantages thereof, for example, light-weight, compact-size, and low energy consumption. Recently, LCD devices have been implemented in flat panel display devices, and are most widely used as monitors of desktop computers and large-scale information display devices as well as monitors of laptop computers. Accordingly, the demand for LCD devices is continuously increasing.

Since most LCD devices are light-receiving devices that regulate the intensity of light incident thereto from the outside to display pictures and images, they essentially require the use of additional light sources, namely, backlight units that irradiate light onto LCD panels.

Generally, depending on the arrangement of cylindrical light-emitting lamp(s), backlight units are used as light sources of LCD devices classified into edge-type backlight units and direct-type backlight units.

According to an edge-type backlight unit with a lamp unit arranged at either lateral side of a light guide plate that guides light emerged from the lamp unit. The lamp unit includes a light-emitting lamp, lamp holders inserted in both ends of the lamp to protect the lamp, and a lamp reflection plate wrapped around the lamp, one side of the lamp reflection plate fits to a face of the light guide plate and adapts to reflect the light incident thereto from the lamp toward the light guide plate.

Such an edge-type backlight unit with a lamp unit arranged at either lateral side of a light guide plate is mainly applied to relatively small-sized LCD devices, such as monitors of laptop computers and desktop computers, and has a good light uniformity and long life-span, and is advantageous in achieving thinness of LCD devices.

As the size of LCD devices is increased to 20 inches or above, active developments on direct-type backlight units are being made. According to such a direct-type backlight unit, a plurality of lamps are arranged in a line on a lower surface of a diffusion plate so that light is directly irradiated over the entire surface of an LCD panel.

The direct-type backlight unit has higher light use efficiency than the edge-type backlight unit, and therefore, is mainly employed in large-screen LCD devices that require high brightness.

Since LCD devices that employ the direct-type backlight unit are used in large-sized monitors and television sets, the time of use thereof is longer than laptop computers, and the number of lamps used is greater than that of the edge-type backlight unit. Accordingly, the possibility that the lamps fail and do not turn on due to an exhausted life span is increased in the direct-type backlight unit as compared to the edge-type backlight unit.

Examples of light sources for LCD devices that use the edge-type and direct-type backlight units include electroluminescence (EL) lamps, light-emitting diodes (LEDs), cold cathode fluorescent lamps (CCFLs), hot cathode fluorescent lamp (HCFLs), and external electrode fluorescent lamps (EEFLs).

Figure 1:
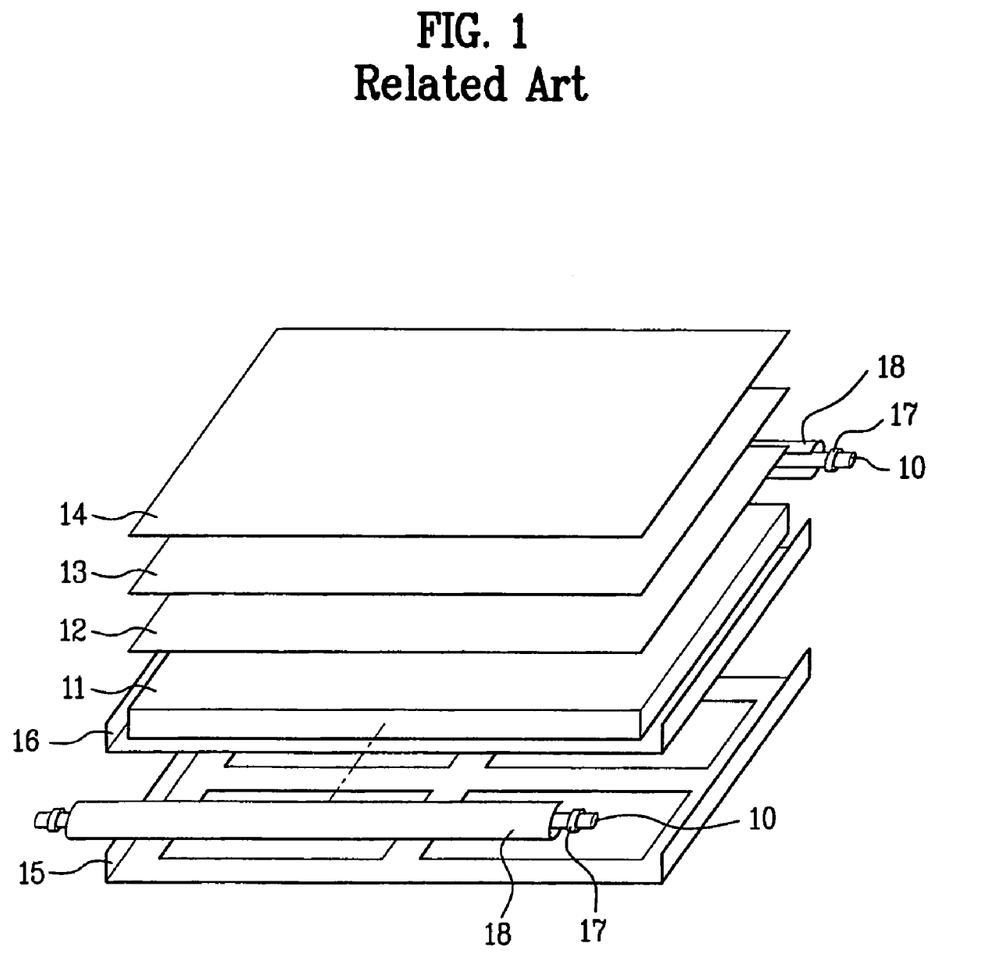
FIG. 1 is a schematic configuration view that illustrates a conventional edge-type backlight unit.

FIG. 1 is a schematic configuration view that illustrates a conventional edge-type backlight unit.

As shown in FIG. 1, the conventional edge-type backlight unit includes a pair of lamps 10 that serve as light sources that emit light. A light guide plate 11 guides the light incident thereto from the lamps 10 to reflect the light to an LCD panel 14. A diffusion sheet 12 diffuses the light emerged upward from the light guide plate 11 over a predetermined angle. A prism sheet 13 collects the diffused light and transmits the collected light to the LCD panel 14. The LCD panel 14 is arranged on the prism sheet 13. One or more fixing structures (not shown) are arranged below the light guide plate 11. A reflection plate 16 reflects the light being transmitted to the fixing structures to the LCD panel 14 in order to minimize the loss of light.

In addition to the above described configuration, the edge-type backlight unit further includes a lamp reflection plate 18 wrapping around each lamp 10 except for a portion of the lamp 10 facing a light incidence face of the light guide plate 11 in order to reduce the loss of light emerged from the lamp 10 to the light incidence face of the light guide plate 11. A pair of lamp holders 17 are arranged at both ends of the lamp 10 to prevent the light guide plate 11 from coming too close to the lamp 10. A plurality of diffusion sheets 12 may be provided if necessary.

The above described edge-type backlight unit, in which lamps are arranged at opposite sides of a light guide plate, may be used in monitors. Where a single lamp is arranged at only one side of a light guide plate, the backlight unit may be applied to a notebook PC.

Figure 2:
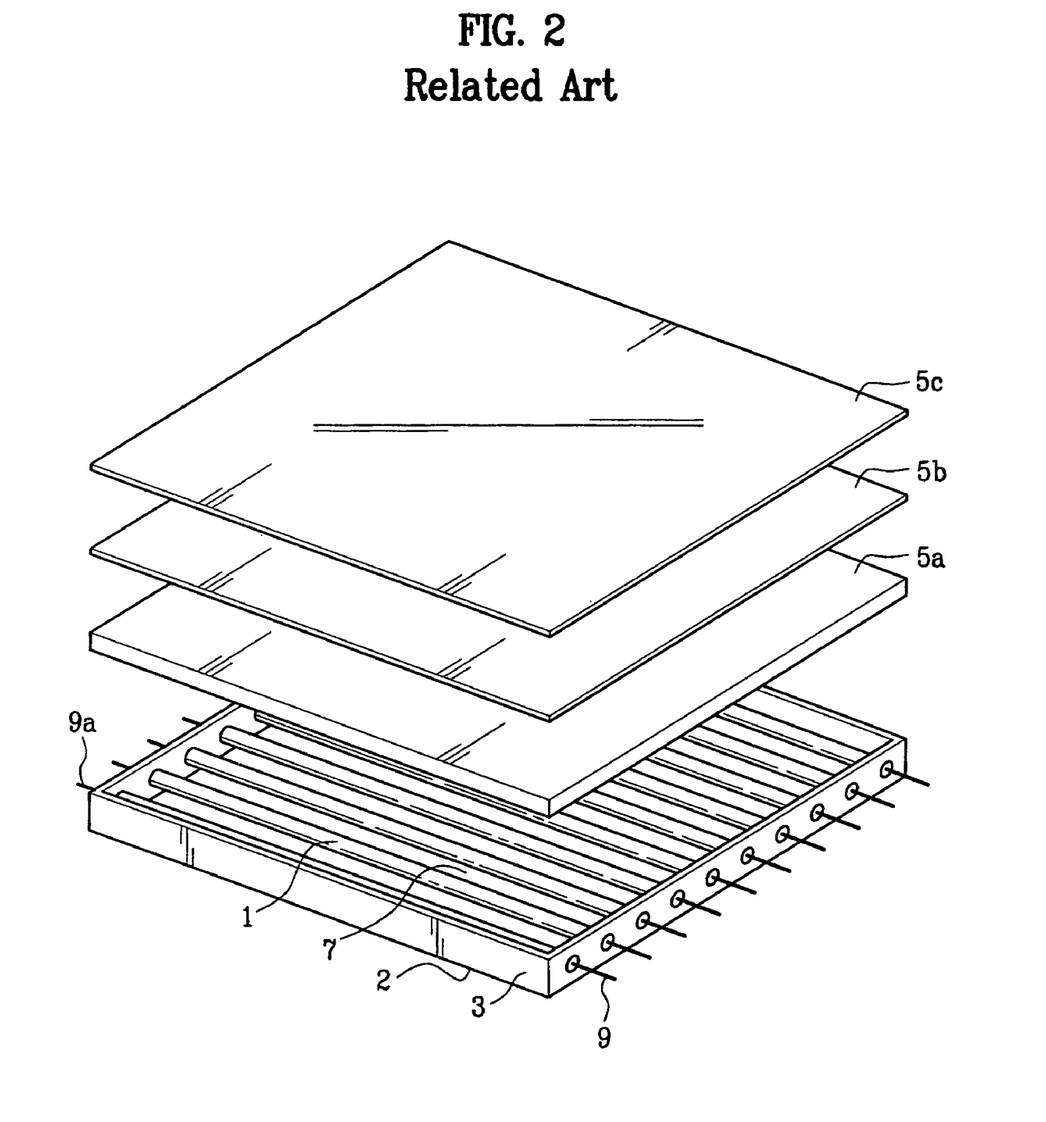
FIG. 2 is a schematic configuration view that illustrates a conventional direct-type backlight unit (KP 04-1563: 2004.09)

As shown in FIG. 2, the conventional direct-type backlight unit for an LCD device includes a plurality of light emitting lamps 1 arranged on a supporting base 2. A rim case 3 is defined along the periphery of the supporting base 2 that fixes the light emitting lamps 1. A plurality of light scattering members 5a, 5b and 5c are arranged between the light emitting lamps 1 and a liquid crystal panel (not shown).

A reflection plate 7 is placed in the rim case 3 on the supporting base 2 that guides light incident thereto from the light emitting lamps 1 to irradiate the light toward a display portion of the liquid crystal panel.

The light emitting lamps 1 are cold cathode fluorescent lamps (CCFLs). In the light emitting lamps 1, electrodes are arranged in a tube at both ends of the tube, and adapted to emit light if power is applied thereto. Both ends of the respective light emitting lamps 1 are fitted into holes perforated through opposite walls of the rim case 3.

Electric power lead lines 9 and 9a are connected to both the electrodes of each light emitting lamp 1 to deliver the power required that drives the light emitting lamp 1. The electric power lead lines 9 and 9a are connected to external connectors that are also connected to a driving circuit. It is necessary to provide the light emitting lamps 1 with the connectors.

The electric power lead line 9 is connected to one of the electrodes of each light emitting lamp 1 and the electric power lead line 9a is connected to the other electrode and they are linked to one connector. One of the electric power lead lines 9 and 9a should be bent to extend below the rim case 3 so as to reach the connector.

The conventional edge-type backlight unit is applicable only to LCDs that have a relatively small scale. The edge-type backlight unit should have a light guide plate that guides light incident thereto from a lamp in an upward direction. The light guide plate is heavy, and thus results in a limit in the manufacture of a light-weight backlight unit.

The direct-type backlight unit has a reflection plate that is arranged beneath light emitting lamps and is insufficient to achieve uniform reflection/diffusion of light emitted from the light emitting lamps, and therefore, is limited in an improvement in uniformity of brightness and use efficiency of light.

SUMMARY

A backlight unit comprises a plurality of light emitting lamps arranged in one direction on a bottom surface of a base support. A lower reflection plate is provided on the bottom surface of the base support below the light emitting lamps. A plurality of upper reflection plates are arranged above the light emitting lamps to correspond to the light emitting lamps in a one to one ratio. Each of the upper reflection plate has a flat plate shape. The lower reflection plate may have a flat plate shape.

The upper reflection plates may be arranged in the form of a continuously connected line above the light emitting lamps, or separately arranged in one direction above the light emitting lamps while being disconnected and spaced apart from one another. Each of the upper reflection plates has a longitudinal length forming connected line above the light emitting lamps.

The upper reflection plates may be made of a material completely reflecting light without transmitting the light, or a material partially transmitting and diffusing light.

The light emitting lamps may be cold cathode fluorescent lamps (CCFLs), external electrode fluorescent lamps (EEFLs), hot cathode fluorescent lamps (HCFLs), or LED lamps.

The light emitting lamps may have a U-shaped shape or other shapes having an indented portion.

When the light emitting lamps are the LED lamps, the upper reflection plates may be arranged in the form of a continuously connected line above the plurality of LED lamps arranged in one direction, or may be separately arranged above a plurality of groups each including at least one LED lamp, respectively, while being disconnected and spaced apart from one another.

The backlight unit may further comprise one or more light scattering members arranged above the light emitting lamps.

The lower reflection plate may have a plurality of recesses formed at positions corresponding to the light emitting lamps.

The recesses may be provided to correspond to the light emitting lamps in a one to one ratio, or may be provided to correspond to a plurality of groups each that includes a predetermined number of the light emitting lamps, to be positioned below one of the light emitting lamps of each group, respectively.

Each of the recesses may have a linear or curvilinear cross sectional profile.

The light emitting lamps may be arranged in the recesses, respectively, parallel to one another.

When the light emitting lamps are LED lamps, the recesses of the lower reflection plate may be arranged in the form of a continuously connected line below the LED lamps to correspond to the LED lamps, or may be separately arranged below the respective LED lamps to correspond to the LED lamps.

The lower reflection plate may further have a plurality of reflection protrusions arranged between the respective adjacent light emitting lamps.

Each of the reflection protrusions may have a linear or curvilinear cross sectional profile, and are arranged parallel to the light emitting lamps.

The cross sectional profile of each reflection protrusion may be continuously connected or disconnected, or may be changed from a linear profile to a curvilinear profile, or vice versa.

Each of the light emitting lamps may have a U-shaped shape or other shapes that have an indented portion, and the reflection protrusions of the lower reflection plate may be arranged in the indented portions of the light emitting lamps and between the respective adjacent light emitting lamps.

When the light emitting lamps are a plurality of LED lamps arranged in a matrix form, the reflection protrusions of the lower reflection plate may be arranged between the LED lamps arranged in one direction such that the cross sectional profile of the reflection protrusions is continuously connected or disconnected, or is changed from a linear profile to a curvilinear profile, or vice versa.

In accordance with another embodiment, there is provided a backlight unit that comprises a plurality of light emitting lamps arranged in one direction on a bottom surface of a base support. A lower reflection plate is provided on the bottom surface of the base support below the light emitting lamps and have a plurality of recesses that correspond to the light emitting lamps, and reflection protrusions between the respective adjacent recesses. A plurality of upper reflection plates are arranged above the light emitting lamps to correspond to the light emitting lamps in a one to one ratio.

Each of the reflection protrusions may have a linear or curvilinear cross sectional profile, and the cross sectional profile of each reflection protrusion may be continuously connected or disconnected, or is changed from a linear profile to a curvilinear profile, or vice versa. The reflection protrusions may be arranged parallel to the light emitting lamps.

Each of the recesses may have a linear or curvilinear cross sectional profile, and the recesses may be provided to correspond to the light emitting lamps in a one to one ratio, or provided to correspond to a plurality of groups each including a predetermined number of light emitting lamps, to be positioned below one of the light emitting lamps of each group, respectively.

The upper reflection plates may be arranged in the form of a continuously connected line above the light emitting lamps, or may be arranged in one direction above the light emitting lamps while being disconnected and spaced apart from one another.

The upper reflection plates may be made of a material that completely reflects light without transmitting the light or a material that partially transmits and diffuses light.

The light emitting lamps may be cold cathode fluorescent lamps (CCFLs), external electrode fluorescent lamps (EEFLs), hot cathode fluorescent lamps (HCFLs), or LED lamps.

The light emitting lamps may have a U-shaped shape or other shapes having an indented portion.

When the light emitting lamps are the LED lamps, the recesses of the lower reflection plate may be arranged in the form of a continuously connected line below the plurality of LED lamps arranged in one direction to correspond to the LED lamps, or separately arranged to correspond to the respective LED lamps, and the reflection protrusions having a linear or curvilinear sectional profile are arranged between the respective adjacent recesses.

When the light emitting lamps are the LED lamps, the upper reflection plates may be arranged in a continuously connected line above the plurality of LED lamps arranged in one direction, or separately arranged above a plurality of groups each including at least one LED lamp, respectively, while being disconnected and spaced apart from one another.

The backlight unit may further comprise one or more light scattering members arranged above the light emitting lamps.

It is to be understood that both the foregoing general description and the following detailed description of are exemplary and explanatory and are intended to provide further explanation of the embodiments as claimed.

DRAWINGS

The accompanying drawings, which are included to provide a further understanding of the embodiments and are incorporated in and constitute a part of this application. In the drawings.

DESCRIPTION

Reference will now be made in detail to a backlight unit in accordance with the preferred embodiments, examples of which are illustrated in the accompanying drawings. Wherever possible, the same reference numbers will be used throughout the drawings to refer to the same or like parts.

Figure 3:
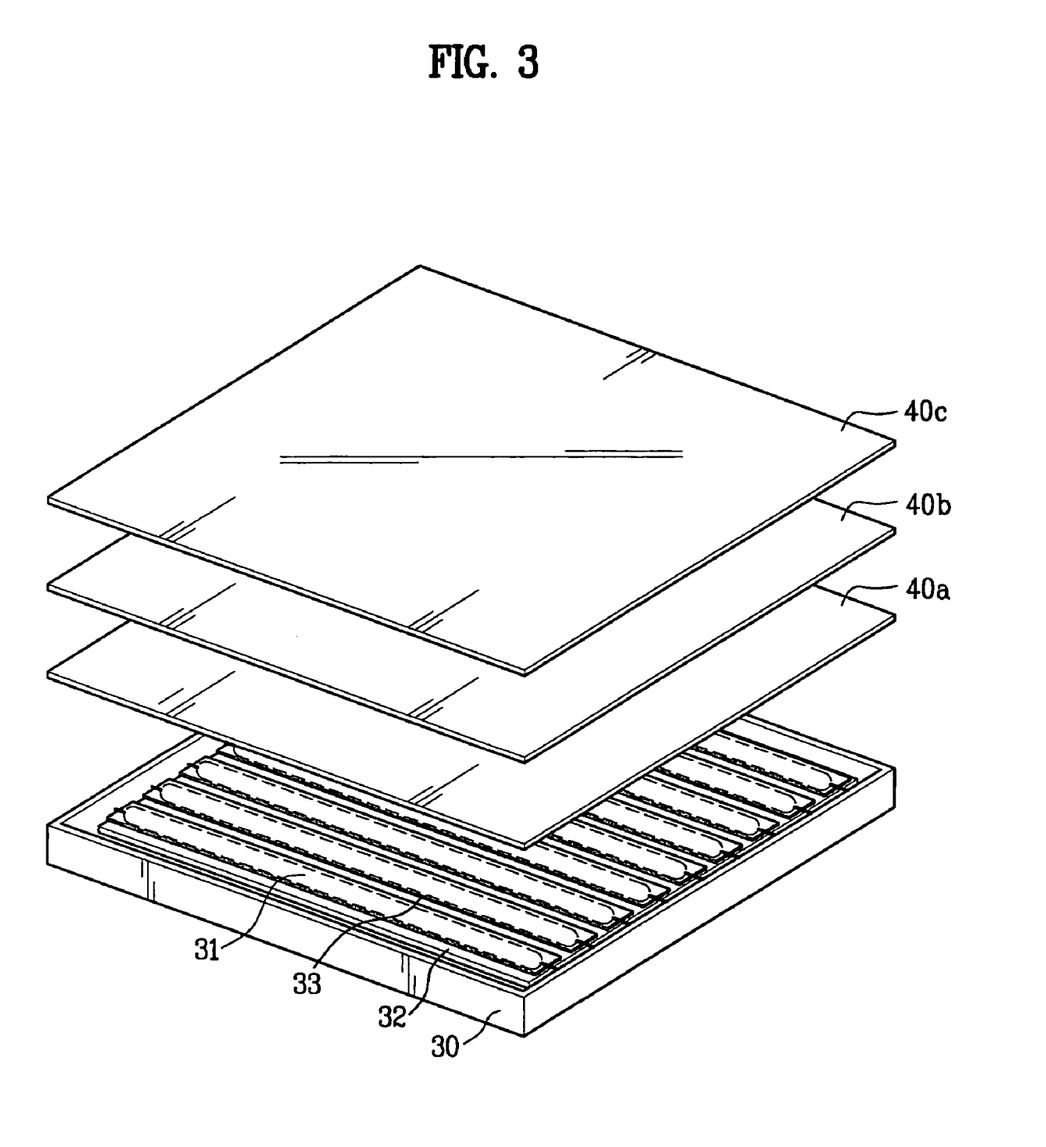
FIG. 3 is a perspective view that illustrates a backlight unit in accordance with a first embodiment.
Figure 4:
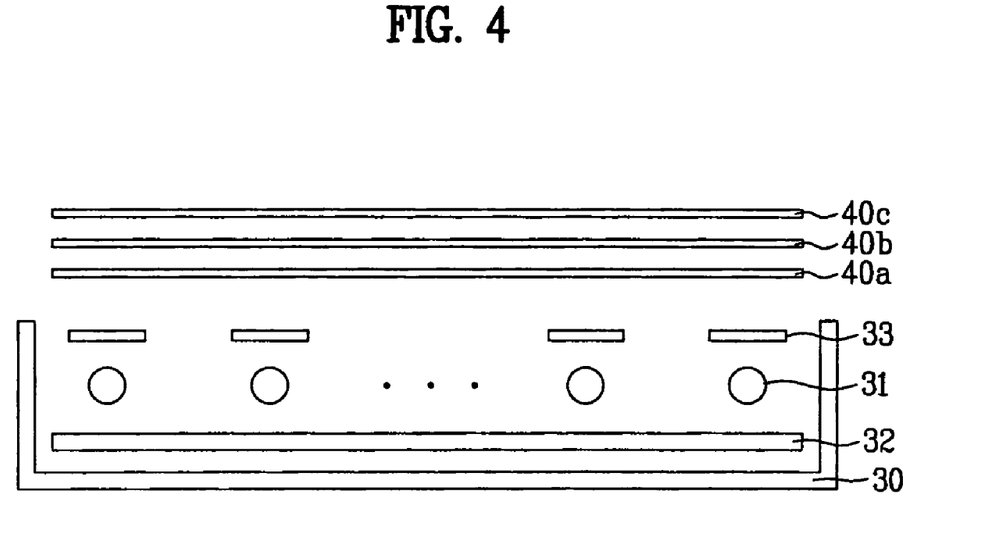
FIG. 4 is a sectional configuration view of the backlight unit in accordance with the first embodiment.

FIG. 3 is a perspective view and FIG. 4 is a sectional configuration view that illustrates the backlight unit in accordance with the first embodiment.

As shown in FIGS. 3 and 4, a plurality of light emitting lamps 31 are arranged in one direction on a bottom surface of a base support 30. The base support 30 is provided on the bottom surface thereof with a lower reflection plate 32 such that light emitted from the light emitting lamps 31 can be irradiated to a display portion of a liquid crystal panel (not shown).

A plurality of upper reflection plates 33 are arranged above the light emitting lamps 31 to correspond to the light emitting lamps 31 in a one to one ratio.

A plurality of light scattering members 40a, 40b, and 40c are interposed between the light emitting lamps 31 and the liquid crystal panel (not shown).

The lower reflection plate 32 has a flat plate shape, and is adapted to irradiate light incident thereto from the light emitting lamps 31 toward a display portion of the liquid crystal panel.

The upper reflection plates 33 serve as lamp shields that prevent generation of bright lines in regions where the light emitting lamps 31 are arranged, and are adapted to reflect the light emerged from the light emitting lamps 31.

The upper reflection plates 33 may be arranged in the form of a continuously connected line above the light emitting lamps 31, or may be separately arranged in one direction above the respective light emitting lamps 31 while being disconnected and spaced apart from one another. Each of the upper reflection plate has a flat plate shape.

The upper reflection plates 33 may be made of a material that completely reflects light without transmitting the light, or material that partially transmits and diffuses light.

The light emitting lamps 31 may be cold cathode fluorescent lamps (CCFLs), external electrode fluorescent lamps (EEFLs), hot cathode fluorescent lamps (HCFLs), or LED lamps.

Although not shown in the drawings, each of the light emitting lamps 31 may have a U-shaped shape or other shapes having an indented portion. The lower reflection plate 32 may have a flat plate shape, and the upper reflection plates 33 may be continuously connected, or disconnected and spaced apart from one another to be positioned above the light emitting lamps 31.

Figure 12:
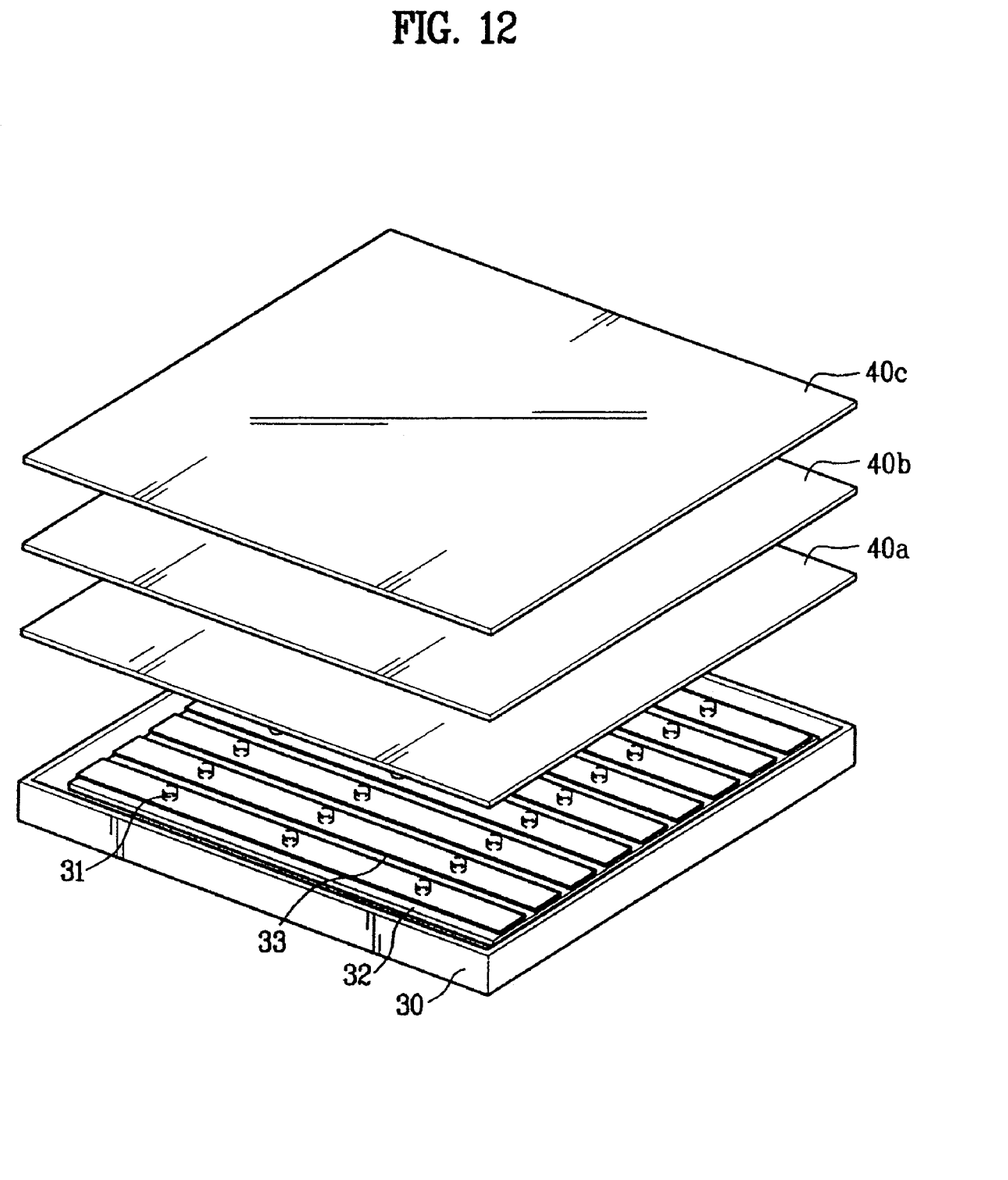
FIG. 12 is a perspective view that illustrates the backlight unit in accordance with the seventh embodiment of the present invention

The light emitting lamps 31 are a plurality of LED lamps arranged in a matrix form. The lower reflection plate 32 may have a flat plate shape. The upper reflection plates 33 may be arranged in the form of a continuously connected line above the LED lamps arranged in one direction, or may be separately arranged above a plurality of groups each including at least one LED lamp while being disconnected and spaced apart from one another as shown in FIG. 12.

Figure 5:
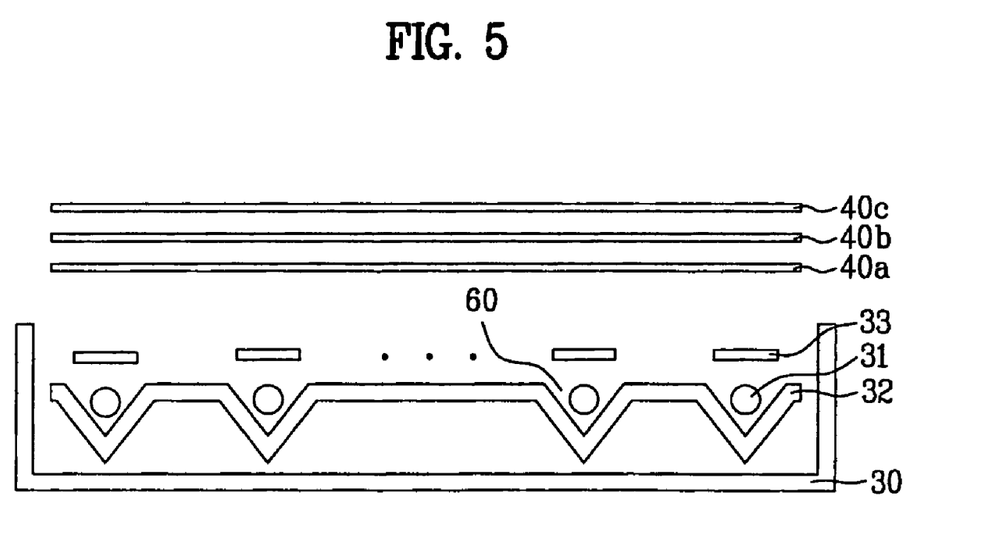
FIG. 5 is a sectional configuration view that illustrates a backlight unit in accordance with a second embodiment.
Figure 10:
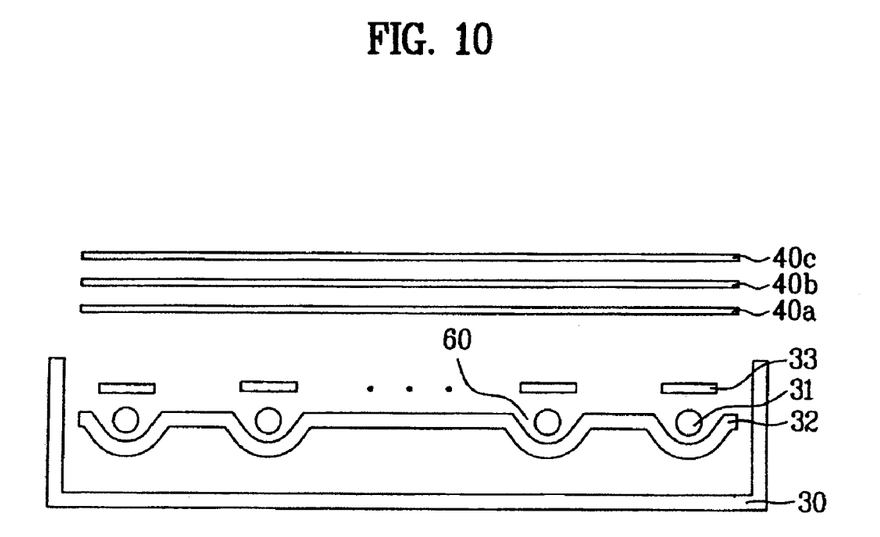
FIG. 10 is a sectional configuration view that illustrates the backlight unit in accordance with the fifth embodiment of the present invention

FIG. 5 is a sectional configuration view that illustrates the backlight unit in accordance with the second embodiment of the present invention. FIG. 10 is a sectional configuration view that illustrates the backlight unit in accordance with the fifth embodiment of the present invention.

The backlight unit according to the second embodiment is characterized in that recesses are formed at the lower reflection plate at positions that correspond to the respective light emitting lamps. Other constituent elements of the second embodiment are similar/equal to those of the first embodiment, and thus, the same reference numbers will be used to refer to the same or like elements.

As shown in FIGS. 5 and 10, the plurality of light emitting lamps 31 are arranged in one direction on the bottom surface of the base support 30. The base support 30 is provided on the bottom surface thereof with the lower reflection plate 32 disposed such that light emitted from the light emitting lamps 31 can be irradiated to a display portion of the liquid crystal panel (not shown). In the present embodiment, the lower reflection plate 32 has a plurality of recesses 60 formed at positions that correspond to the respective light emitting lamps 31 such that light emitted from the light emitting lamps 31 can be more efficiently irradiated to a display portion of the liquid crystal panel.

The recesses 60 may be provided to correspond to the light emitting lamps 31 in a one to one ratio, or may be provided to correspond to a plurality of groups of the light emitting lamps 31 in a one to one ratio, each group including at least two light emitting lamps. Each of the recesses 60 has a linear or curvilinear cross sectional profile.

When the recesses 60 are provided to correspond to the light emitting lamps 31 in a one to one ratio, the light emitting lamps 31 are arranged in the recesses 60 parallel to one another.

When the recesses 60 are provided to correspond to the plurality of groups, each includes a predetermined number of the light emitting lamps, in a one to one ratio. One of the light emitting lamps of each group is arranged in an associated with one of the recesses 60.

The upper reflection plates 33 are arranged above the light emitting lamps 31 to correspond to the light emitting lamps 31 in a one to one ratio.

The light scattering members 40a, 40b, and 40c are interposed between the light emitting lamps 31 and the liquid crystal panel (not shown).

The upper reflection plates 33 serve as lamp shields that prevent generation of bright lines in regions where the light emitting lamps 31 are arranged, and are adapted to reflect light emerged from the light emitting lamps 31.

The upper reflection plates 33 may be arranged in the form of a continuously connected line above the light emitting lamps 31, or may be separately arranged in one direction above the respective light emitting lamps 31 while being disconnected and spaced apart from one another.

The upper reflection plates 33 may be made of a material that completely reflects light without transmitting the light, or material that partially transmits and diffuses light.

The light emitting lamps 31 may be cold cathode fluorescent lamps (CCFLs), external electrode fluorescent lamps (EEFLs), hot cathode fluorescent lamps (HCFLs), or LED lamps.

Although not shown in the drawings, each of the light emitting lamps 31 may have a U-shaped shape or other shapes having an indented portion. The lower reflection plate 32 may have a flat plate shape with the recesses formed at positions corresponding to the respective light emitting lamps 31, and the upper reflection plates 33 may be continuously connected, or disconnected and spaced apart from one another to be positioned above the light emitting lamps 31.

As shown in FIG. 12, when the light emitting lamps 31 are a plurality of LED lamps arranged in a matrix form, the lower reflection plate 32 may be configured such that the recesses 60 may be arranged in the form of a continuously connected line located below the LED lamps to correspond to the LED lamps, or may be separately arranged below the LED lamps at positions corresponding to the respective LED lamps. The upper reflection plates 33 may be arranged in the form of a continuously connected line above the plurality of lamps arranged in one direction, or may be separately arranged above a plurality of groups that includes at least one LED lamp while being disconnected and spaced apart from one another.

Figure 6:
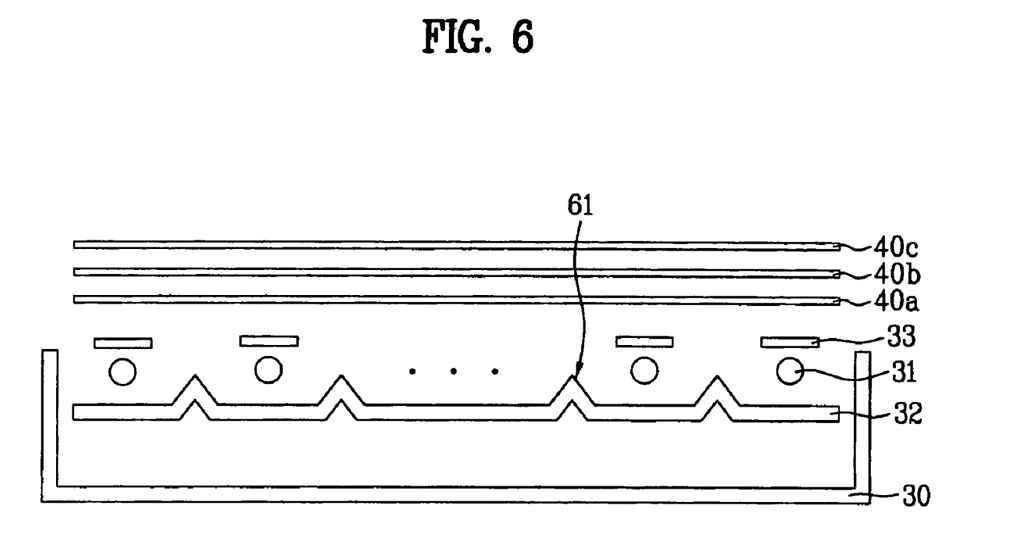
FIG. 6 is a sectional configuration view that illustrates a backlight unit in accordance with a third embodiment.

The backlight unit according to the third embodiment, as shown in FIG. 6, is characterized in that the lower reflection plate is formed with reflection protrusions between the respective adjacent light emitting lamps and the upper reflection plates are arranged above the light emitting lamps to correspond to the respective light emitting lamps. Other constituent elements of the third embodiment are similar/equal to those of the first embodiment of the present invention, and thus the same reference numbers will be used to refer to the same or like elements.

As shown in FIG. 6, the plurality of light emitting lamps 31 are arranged in one direction on the bottom surface of the base support 30. The base support 30 is provided on the bottom surface thereof with the lower reflection plate 32 such that light emitted from the light emitting lamps 31 can be irradiated to a display portion of the liquid crystal panel (not shown).

In the present embodiment, the lower reflection plate 32 has a plurality of reflection protrusions 61 formed between the respective adjacent light emitting lamps 31 such that light emitted from the light emitting lamps 31 can be more efficiently irradiated to a display portion of the liquid crystal panel. The reflection protrusions 61 are arranged in parallel to the light emitting lamps 31 and have a linear or curvilinear cross sectional profile.

Figure 11:
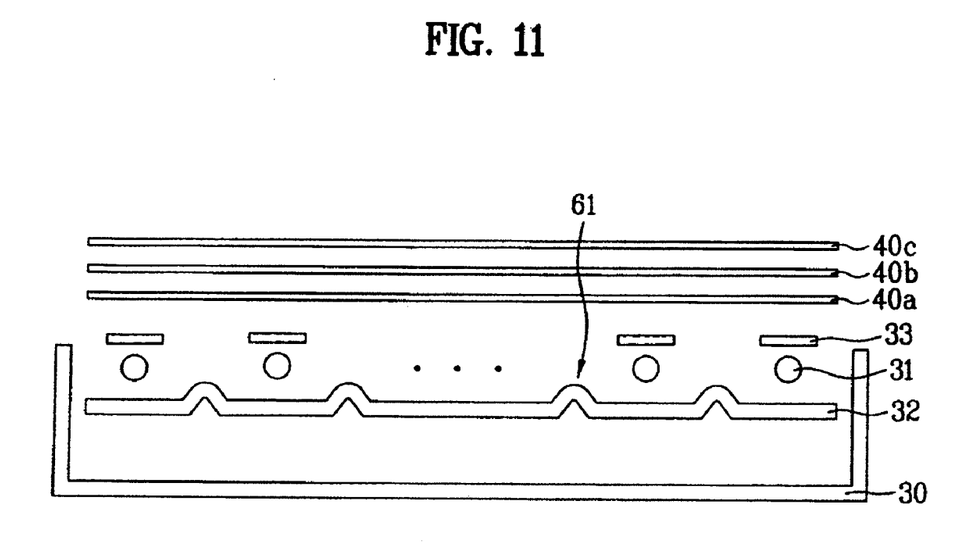
FIG. 11 is a sectional configuration view that illustrates the backlight unit in accordance with the sixth embodiment of the present invention

The cross sectional profile of each reflection protrusion 61 may be continuously connected or disconnected, or may be changed from a linear profile to a curvilinear profile, or vice versa as shown in FIGS. 6 and 11.

The reflection protrusions 61 formed at the lower reflection plate 32 serve to achieve uniform brightness distribution of light emitted from the light emitting lamps 31.

The upper reflection plates 33 are arranged above the light emitting lamps 31 to correspond to the light emitting lamps 31 in a one to one ratio.

The plurality of light scattering members 40a, 40b, and 40c are interposed between the light emitting lamps 31 and the liquid crystal panel (not shown).

The upper reflection plates 33 serve as lamp shields that prevent generation of bright lines in regions where the light emitting lamps 31 are arranged, and are adapted to reflect light emerged from the light emitting lamps 31.

The upper reflection plates 33 may be arranged in the form of a continuously connected line above the light emitting lamps 31, or may be separately arranged in one direction above the respective light emitting lamps 31 while being disconnected and spaced apart from one another.

The upper reflection plates 33 may be made of a material that completely reflects light without transmitting the light, or material that partially transmits and diffuses light.

The light emitting lamps 31 may be cold cathode fluorescent lamps (CCFLs), external electrode fluorescent lamps (EEFLs), hot cathode fluorescent lamps (HCFLs), or LED lamps.

Although not shown in the drawings, each of the light emitting lamps 31 may have a U-shaped shape or other shapes having an indented portion. The reflection protrusions 61 of the lower reflection plate 32 may be arranged in the indented portions of the light emitting lamps 31 and between the respective adjacent light emitting lamps 31. Each of the reflection protrusions 61 has a linear or curvilinear cross sectional profile. The upper reflection plates 33 may be continuously connected, or disconnected and spaced apart from one another to be positioned above the light emitting lamps 31.

When the light emitting lamps 31 are a plurality of LED lamps arranged in a matrix form, the reflection protrusions 60 of the lower reflection plate 32 may be arranged between the respective adjacent LED lamps arranged in one direction, and the cross sectional profile of each reflection protrusion 61 may be continuously connected or disconnected, or may be changed from a linear profile to a curvilinear profile, or vice versa. The upper reflection plates 33 may be arranged in the form of a continuously connected line above the plurality of LED lamps arranged in one direction, or may be separately arranged above groups of LED lamps each including at least one LED lamp while being disconnected and spaced apart from one another.

Figure 7:
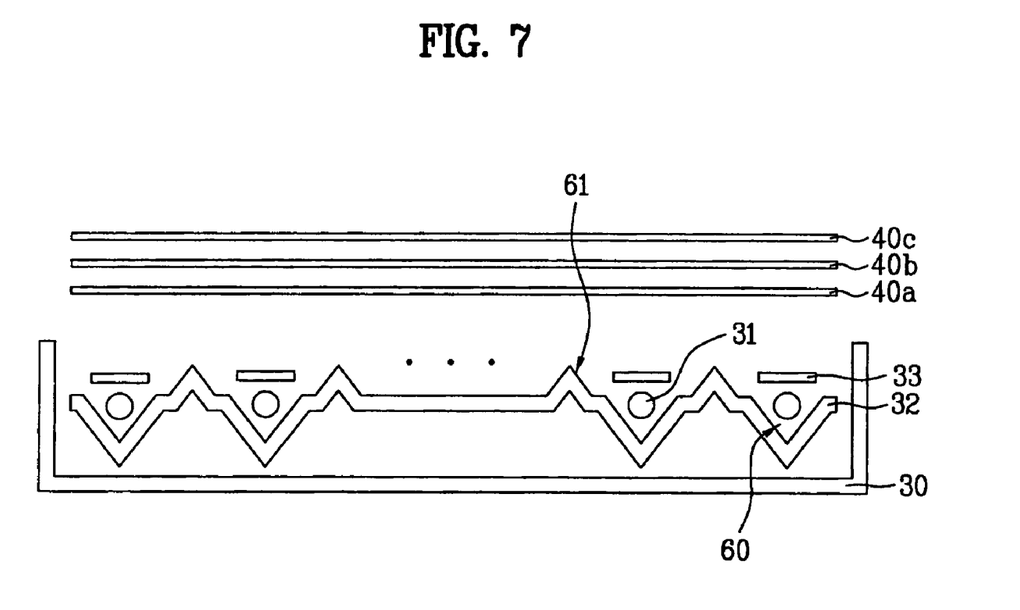
FIG. 7 is a sectional configuration view that illustrates a backlight unit in accordance with a fourth embodiment.

The backlight unit according to the fourth embodiment, as shown in FIG. 7, is characterized in that the lower reflection plate is formed with the recesses at positions that corresponds to the light emitting lamps and the reflection protrusions between the respective adjacent recesses. Other constituent elements of the fourth embodiment are similar/equal to those of the first embodiment of the present invention, and thus the same reference numbers will be used to refer to the same or like elements.

As shown in FIG. 7, the plurality of light emitting lamps 31 are arranged in one direction on the bottom surface of the base support 30. The base support 30 is provided on the bottom surface thereof with the lower reflection plate 32 such that light emitted from the light emitting lamps 31 can be irradiated to a display portion of the liquid crystal panel (not shown).

In the present embodiment, the lower reflection plate 32 has the plurality of recesses 60 formed at positions that correspond to the respective light emitting lamps 31 such that light emitted from the light emitting lamps 31 can be more efficiently irradiated to a display portion of the liquid crystal panel, and also has the plurality of reflection protrusions 61 formed between the respective adjacent recesses 60, each reflection protrusion 61 having a linear or curvilinear cross sectional profile. The cross sectional profile of each reflection protrusion 61 may be continuously connected or disconnected, or may be changed from a linear profile to a curvilinear profile, or vice versa.

The recesses 60 may be provided to correspond to the light emitting lamps 31 in a one to one ratio, or may be provided to correspond to a plurality of groups, each includes at least two light emitting lamps 31, in a one to one ratio. Each of the recesses 60 has a linear or curvilinear cross sectional profile.

When the recesses 60 are provided to correspond to the light emitting lamps 31 in a one to one ratio, the light emitting lamps 31 are arranged in the recesses 60, respectively, parallel to each other.

When the recesses 60 are provided to correspond to the plurality of groups, each includes a predetermined number of the light emitting lamps 31, in a one to one ratio, one of the light emitting lamps 31 of each group is arranged in an associated one of the recesses 60.

The recesses 60 and reflection protrusions 61 formed at the lower reflection plate 32 serve to achieve uniform brightness distribution and to increase use efficiency of light emitted from the light emitting lamps 31.

The upper reflection plates 33 are arranged above the light emitting lamps 31 to correspond to the light emitting lamps 31 in a one to one ratio.

The plurality of light scattering members 40a, 40b, and 40c are interposed between the light emitting lamps 31 and the liquid crystal panel (not shown).

The upper reflection plates 33 serve as lamp shields that prevent generation of bright lines in regions where the light emitting lamps 31 are arranged, and are adapted to reflect light emerged from the light emitting lamps 31.

The upper reflection plates 33 may be arranged in the form of a continuously connected line above the light emitting lamps 31, or may be separately arranged in one direction while being disconnected and spaced apart from one another.

The upper reflection plates 33 may be made of a material that completely reflects light without transmitting the light, or material that partially transmits and diffuses light.

The light emitting lamps 31 may be cold cathode fluorescent lamps (CCFLs), external electrode fluorescent lamps (EEFLs), hot cathode fluorescent lamps (HCFLs), or LED lamps.

Although not shown in the drawings, each of the light emitting lamps 31 may have a U-shaped shape or other shapes having an indented portion. The lower reflection plate 32 is formed with the recesses 60 at positions corresponding to the respective light emitting lamps 31 and formed with the reflection protrusions 61, having a linear or curvilinear cross sectional profile, between the respective adjacent recesses 60. The upper reflection plates 33 may be continuously connected, or disconnected and spaced apart from one another to be positioned above the light emitting lamps 31.

When the light emitting lamps 31 are a plurality of LED lamps arranged in a matrix form, the recesses 60 of the lower reflection plate 32 may be arranged in the form of a continuously connected line below the plurality of LED lamps arranged in one direction, or may be separately arranged below the LED lamps to correspond to the respective LED lamps, and the reflection protrusions, having a linear or curvilinear cross sectional profile, may be formed between the respective adjacent recesses. The upper reflection plates 33 may be arranged in the form of a continuously connected line above the plurality of LED lamps, or may be separately arranged above a plurality of groups of LED lamps, each including at least one LED lamp, while being disconnected and spaced apart from one another.

Figure 8:
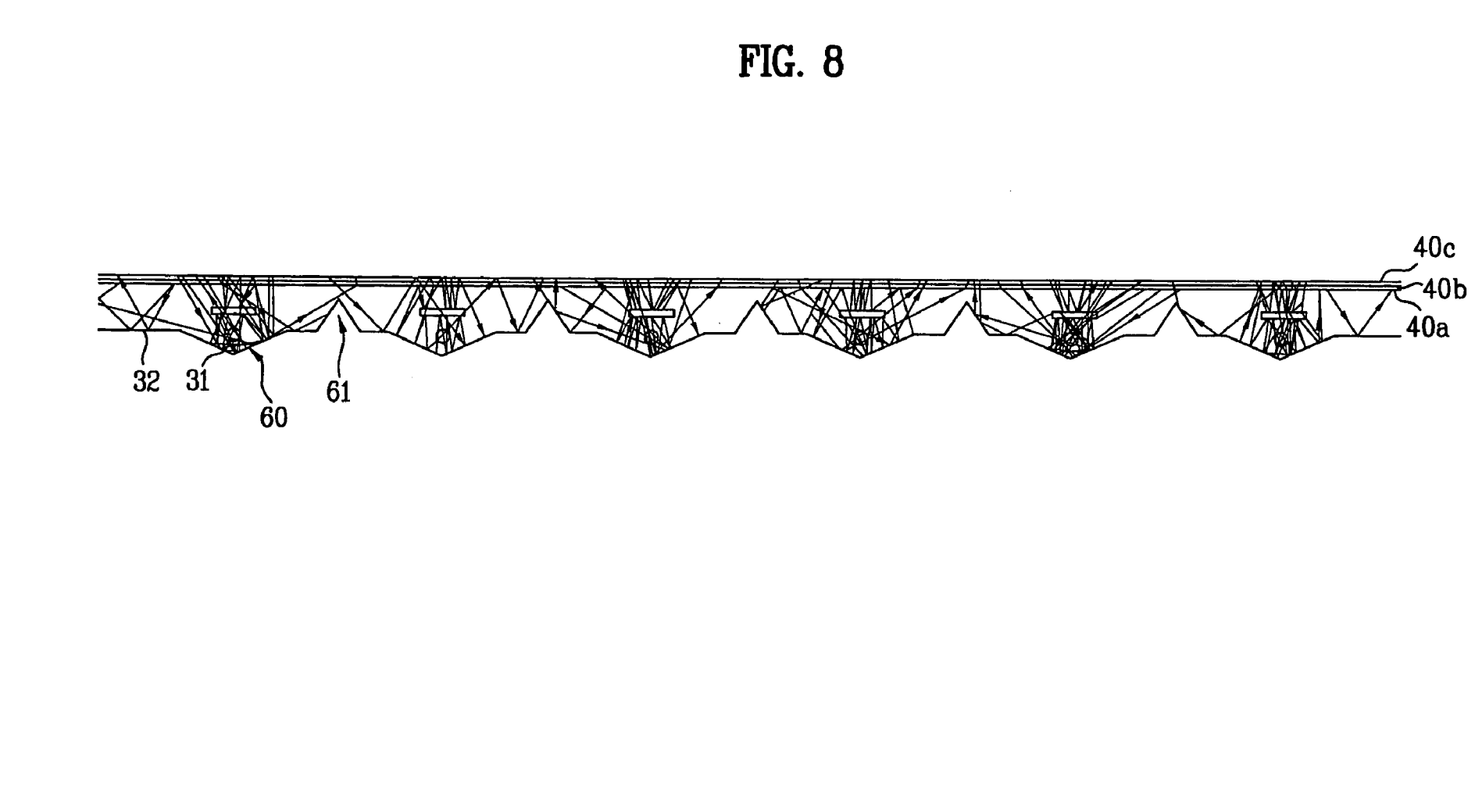
FIGS. 8 and 9 are views that illustrate the traveling of light emerged from lamps of the backlight unit.
Figure 9:
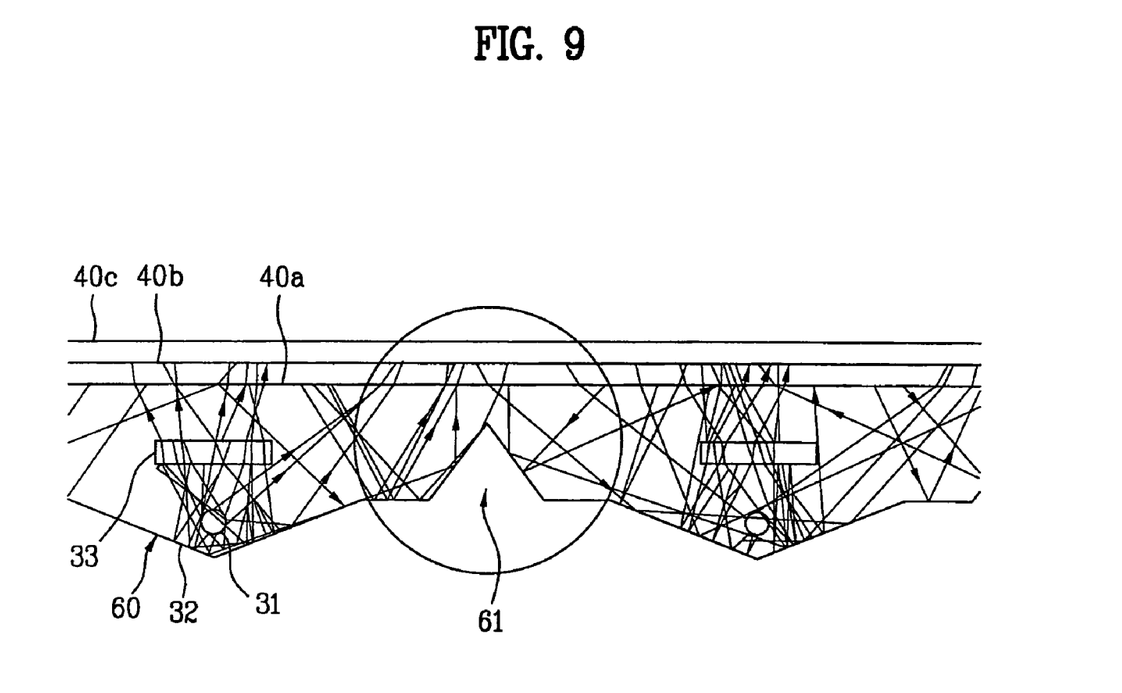

FIGS. 8 and 9 are views that illustrate the traveling of light emerged from the lamps of the backlight unit in accordance with the different embodiments.

Specifically, FIGS. 8 and 9 illustrate the traveling of light when using the lower reflection plate 32 formed with the recesses 60 and reflection protrusions 61. Since the recesses 60 and reflection protrusions 61 of the lower reflection plate 32 act to reflect light emitted from the light emitting lamps 31, the light emerged from the light emitting lamps 31 can be guided upward via reflection and transmission within regions defined by the respective recesses 60 and reflection protrusions 61. The resulting reflection and transmission results in a reduction in the traveling path of light, and thus can achieve an improvement in use efficiency of light.

In the present embodiments, upper reflection plates are arranged above light emitting lamps. This has the effect of achieving an improvement in uniform reflection/diffusion of light. As a result, a high uniformity in brightness even if distances between the light emitting lamps are reduced, and therefore, can have a reduced thickness of the resulting backlight unit as compared to a conventional direct-type backlight unit.

According to the present embodiments, a lower reflection plate is formed with recesses and/or reflection protrusions. This has the effect of achieving an increase in use efficiency of light while achieving high uniformity in brightness. As a result, the number of light emitting lamps can be reduced, resulting in a reduction in production costs.

The present embodiments can achieve a reduction in the traveling path of light emerged from the light emitting lamps, resulting in an improvement in use efficiency of light.

The direct-type backlight unit has no necessity for a heavy light guide plate. Accordingly, the backlight unit of the present invention is lighter than a conventional edge-type backlight unit.

It will be apparent to those skilled in the art that various modifications and variations can be made in the present embodiments without departing from the spirit or scope of the inventions. Thus, it is intended that the present embodiments cover the modifications and variations of this invention provided they come within the scope of the appended claims and their equivalents.

What is claimed is:

1. A backlight unit comprising:
a plurality of light emitting lamps arranged in one direction on a bottom surface of a base support;
a lower reflection plate provided on the bottom surface of the base support below the light emitting lamps and having a plurality of recesses corresponding to the light emitting lamps, reflection protrusions at portions between the respective adjacent light emitting lamps, and flat plate surfaces between the adjacent recess and reflection protrusion in parallel with the bottom surface of the base support; and
a plurality of upper reflection plates having a flat plate shape and arranged above the light emitting lamps to correspond to the light emitting lamps in a one to one ratio.

2. The backlight unit as set forth in claim 1, wherein each of the reflection protrusions has a linear or curvilinear cross sectional profile, and the cross sectional profile of each reflection protrusion is continuously connected.

3. The backlight unit as set forth in claim 1, wherein the reflection protrusions are arranged parallel to the light emitting lamps.

4. The backlight unit as set forth in claim 1, wherein each of the recesses has a linear or curvilinear cross sectional profile, and the recesses are provided to correspond to the light emitting lamps in a one to one ratio, to be positioned below one of the light emitting lamps of each group.

5. The backlight unit as set forth in claim 1, wherein the upper reflection plates are arranged in the form of a continuously connected line above the light emitting lamps.

6. The backlight unit as set forth in claim 1, wherein the upper reflection plates are arranged in one direction above the light emitting lamps while being disconnected and spaced apart from one another.

7. The backlight unit as set forth in claim 1, wherein the upper reflection plates are made of a material that completely reflects light without transmitting the light.

8. The backlight unit as set forth in claim 1, wherein the upper reflection plates are made of a material that partially transmits and diffuses light.

9. The backlight unit as set forth in claim 1, wherein the light emitting lamps are selected from the group consisting of cold cathode fluorescent lamps (CCFLs), external electrode fluorescent lamps (EEFLs), hot cathode fluorescent lamps (HCFLs), or LED lamps.

10. The backlight unit as set forth in claim 9, wherein, when the light emitting lamps are the LED lamps, the recesses of the lower reflection plate are arranged in the form of a continuously connected line below the plurality of LED lamps are separately arranged to correspond to the respective LED lamps, and the reflection protrusions, having a curvilinear sectional profile, are arranged between the respective adjacent recesses.

11. The backlight unit as set forth in claim 10, wherein the reflection protrusions have a linear sectional profile.

12. The backlight unit as set forth in claim 9, wherein, when the light emitting lamps are the LED lamps, the recesses of the lower reflection plate are arranged in the form of a continuously connected line below the plurality of LED lamps arranged in one direction to correspond to the LED lamps, and the reflection protrusions, having a linear sectional profile, are arranged between the respective adjacent recesses.

13. The backlight unit as set forth in claim 12, wherein the reflection protrusions have a curvilinear sectional profile.

14. The backlight unit as set forth in claim 9, wherein, when the light emitting lamps are the LED lamps, the upper reflection plates are arranged in a continuously connected line above the plurality of LED lamps arranged in one direction, which includes at least one LED lamp while being disconnected and spaced apart from one another.

15. The backlight unit as set forth in claim 9, wherein, when the light emitting lamps are the LED lamps, the upper reflection plates are separately arranged above a plurality of groups that includes at least one LED lamp while being disconnected and spaced apart from one another.

16. The backlight unit as set forth in claim 1, further comprising:
one or more light scattering members arranged above the light emitting lamps.

17. The backlight unit as set forth in claim 1, wherein each of the reflection protrusions has a linear or curvilinear cross sectional profile, and the cross sectional profile of each reflection protrusion is continuously disconnected.

18. The backlight unit as set forth in claim 1, wherein each of the reflection protrusions has a linear or curvilinear cross sectional profile, and the cross sectional profile of each reflection protrusion is changed from a linear profile to a curvilinear profile.

19. The backlight unit as set forth in claim 1, wherein each of the recesses has a linear or curvilinear cross sectional profile, and the recesses are provided to correspond to a plurality of groups, each including a predetermined number of light emitting lamps, to be positioned below one of the light emitting lamps of each group.

* * * * *